United States Patent [19]
Yoshimura et al.

[11] Patent Number: 5,418,731
[45] Date of Patent: May 23, 1995

[54] NUMERICAL CONTROL UNIT FOR NON-CIRCULAR WORKPIECE FABRICATING MACHINE

[75] Inventors: Tatsuhiro Yoshimura; Homare Adachi, both of Nagoya, Japan

[73] Assignee: Okuma Corporation, Nagoya, Japan

[21] Appl. No.: 202,602

[22] Filed: Feb. 28, 1994

[30] Foreign Application Priority Data

Feb. 26, 1993 [JP] Japan .................. 5-062900

[51] Int. Cl.⁶ ............................................. G05B 19/18
[52] U.S. Cl. ........................ 364/474.31; 364/474.06; 318/573
[58] Field of Search ......... 364/474.06, 474.28–474.31; 318/569, 573, 571; 51/165.71; 451/4, 5, 9

[56] References Cited
U.S. PATENT DOCUMENTS

| | | |
|---|---|---|
| 4,963,805 | 10/1990 | Suzuki et al. .................... 318/569 |
| 5,031,107 | 7/1991 | Suzuki et al. ................ 364/474.28 |
| 5,060,164 | 10/1991 | Yoneda et al. ................ 364/474.29 |

Primary Examiner—Roy N. Envall, Jr.
Assistant Examiner—Steven R. Garland
Attorney, Agent, or Firm—Dickstein, Shapiro & Morin

[57] ABSTRACT

A numerical control unit for a non-circular workpiece fabricating machine automatically smoothes and interpolates lift data containing errors so as to obtain new substantially error-free lift data, and allows the fabricating machine to fabricate a non-circular workpiece with a smooth rotation of a main spindle and with less vibrations of a wheel spindle stock. The numerical control unit converts lift data whose pitch is unequal into lift data whose pitch is equal. Errors in the equal pitch lift data are extended by a second finite difference calculation, are repeatedly smoothed and interpolated until they meet an application criterion. Then, the lift data are subject to inverse calculation to obtain new lift data. The new lift data are used to obtain X/C-axis data taking a diameter of the wheel spindle stock and period of time per rotation of the workpiece into consideration. Thereafter, the workpiece is fabricated on the basis of the X/C-axis data.

4 Claims, 9 Drawing Sheets

| An | Bn | Cn | → | C'n | B'n | A'n |
|---|---|---|---|---|---|---|
| | | SMOOTHING/INTERPOLATION USING SPLINE FUNCTION IS REPEATED UNTIL DATA MEET APPLICATION CRITERIA | | | | |
| 120 | | | | | | 117 |
| | −3 | | | | 0 | |
| 117 | | 0 | → | 0 | | 117 |
| | −3 | | | | 0 | |
| 114 | | 8 | → | 0.5 | | 117 |
| | 5 | | | | 0.5 | |
| 119 | | −8 | → | 0.5 | | 117.5 |
| | −3 | | | | 1 | |
| 116 | | 5 | → | 0.5 | | 118.5 |
| | 2 | | | | 1.5 | |
| 118 | | 1 | → | 0.5 | | 120 |
| | 3 | | | | 2 | |
| 121 | | 1 | → | 0 | | 122 |
| | 4 | | | | 2 | |
| 125 | | −3 | → | 0 | | 124 |
| | 1 | | | | 2 | |
| 126 | | −1 | → | 0 | | 126 |
| | 0 | | | | 2 | |
| 126 | | 2 | → | 0 | | 128 |
| | 2 | | | | 2 | |
| 128 | | 1 | → | −1 | | 130 |
| | 3 | | | | 1 | |
| 131 | | −3 | → | −1 | | 131 |
| | 0 | | | | 0 | |
| 131 | | −1 | → | −1 | | 131 |
| | −1 | | | | −1 | |
| 130 | | | | | | 130 |

NUMERICAL CONTROL UNIT FOR NON-CIRCULAR WORKPIECE FABRICATING MACHINE

BACKGROUND OF THE INVENTION

1. Field off the Invention

This invention relates to a numerical control unit for a non-circular workpiece fabricating machine, and more particularly to a numerical control unit which controls the rotation of a main spindle for rotating the workpieces and displacement of tools for fabricating the workpieces in such a machine.

Further, the invention relates to a numerical control unit for a numerically controlled grinding machine (called "NC grinding machine" hereinafter) to fabricate non-circular workpieces, and controls the rotation of the main spindle and displacement of a wheel spindle stock. Specifically, the numerical control unit automatically produces data denoting a new and smooth shape of the workpiece (called "new lift data") by eliminating errors from existing data on the shape of a non-circular workpiece. Using the new lift data, the control unit then produces X/C-axis data which denote displacement position of the wheel spindle stock and a rotation angle of the main spindle on the basis of a diameter of a grinding wheel and period of time per rotation of the workpiece. The rotation of the main spindle and displacement of the wheel spindle stock are controlled on the basis of the X/C-axis data.

2. Description of the Related Art

Generally, an NC grinding machine is used to fabricate non-circular workpieces such as cams by synchronously controlling a main spindle and displacement of a wheel spindle stock. X/C-axis data which denote displacement of the wheel spindle stock and a rotation angle of the main spindle (i.e., pitch) are usually prepared beforehand based on data (lift data) representing the shape of the non-circular workpiece, a diameter of a grinding wheel and period of time per rotation of the workpiece. When designing a cam, theoretical values are usually determined-first, and then a reference model is fabricated, modified and measured to meet the requirements of an actual cam. Data on the reference model are used to obtain lift data to actually fabricate cams. Such data usually contain errors during the designing, modification and measurement. When the workpiece is fabricated according to X/C-axis data prepared based on such lift data, either the main spindle or the wheel spindle stock tend to vibrate, thereby causing the workpiece to have a rough surface and be poor in its performance. Further, a wheel spindle stock displacing mechanism is prone to a problem such as repeated grinding stress, which disadvantageously shortens the life of the NC grinding machine.

Figure 10:
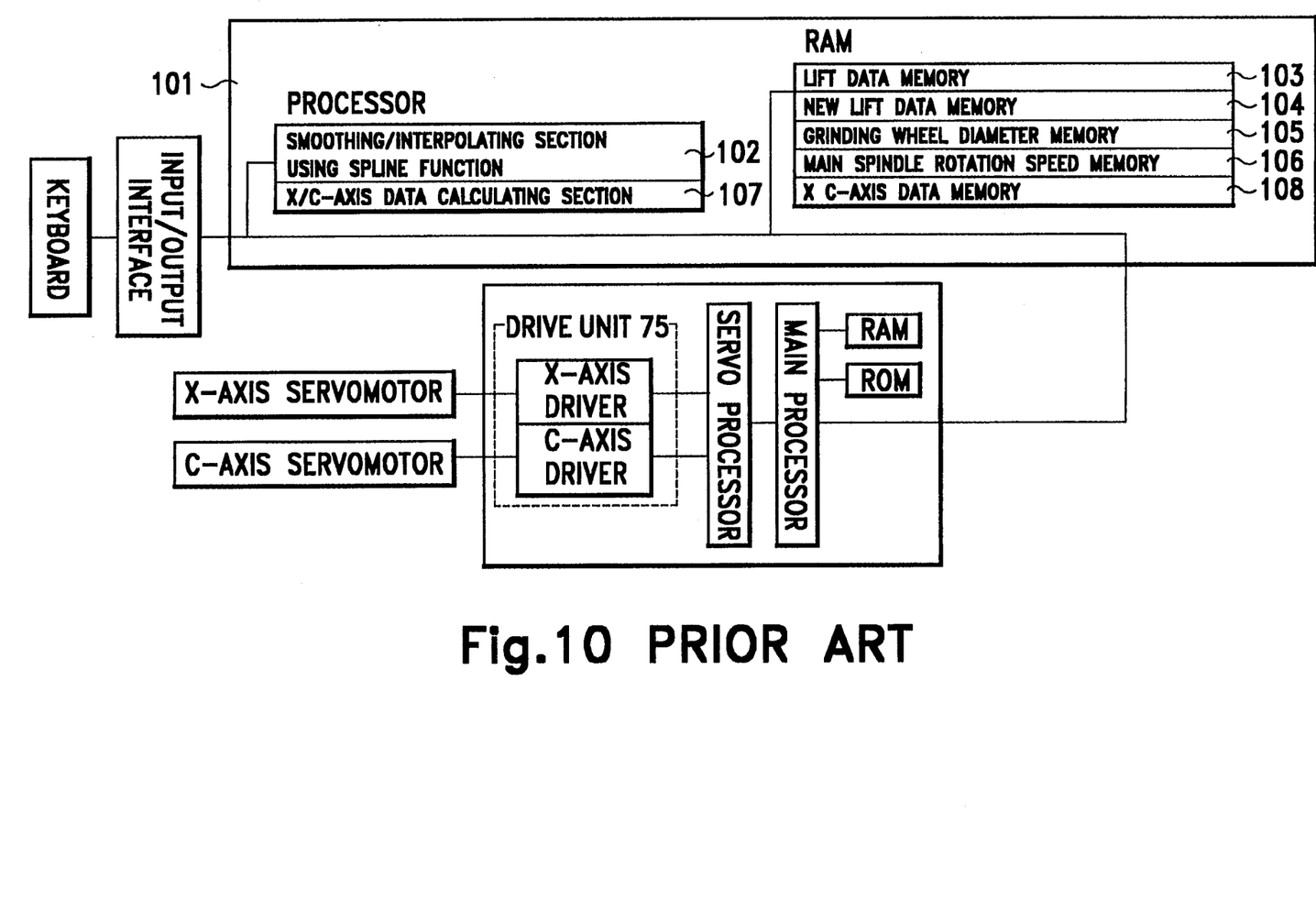
FIG. 10 is a block diagram of a non-circular data pre-processing section in a prior art numerical control unit.

Therefore, the lift data are usually smoothed and interpolated so as to eliminate the errors. The smoothing and interpolation are carried out by a non-circular data pre-processing unit 101 as shown in FIG. 10 of the accompanying drawings. In the non-circular data pre-processing unit 101, a smoothing/interpolation calculating section 102 smoothes and interpolates the lift data, which are stored in a lift data memory 103, based on a spline function. The smoothed and interpolated data (called "new lift data") are stored in a new lift data memory 104. Next, an X/C-axis data calculating section 107 produces X/C-axis data based on the new lift data, data on the diameter off the grinding wheel (stored in a grinding wheel data memory 105), and rotation speed data of the main rotary spindle (stored in a main spindle rotation speed memory 106). The obtained X/C-axis data are stored in an X/C axis data memory 108.

The NC grinding machine fabricates the non-circular workpiece based on the X/C-axis data which have been smoothed and interpolated.

Figure 11:
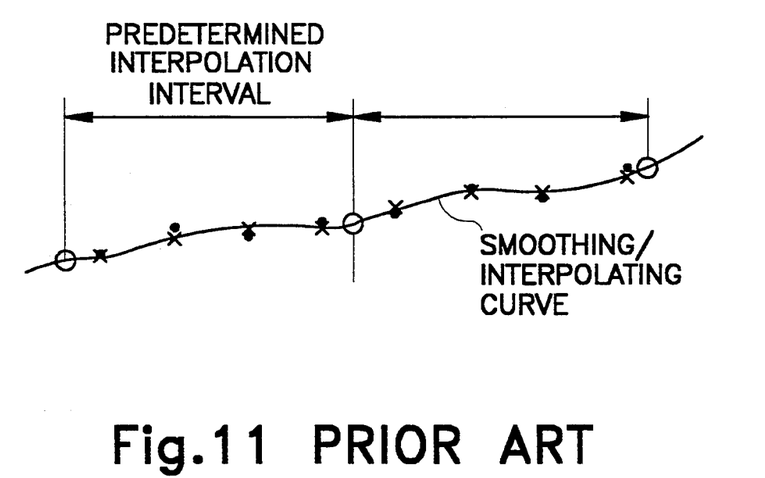
FIG. 11 is a graph showing a smoothing/interpolating curve based on new lift data in the machine of FIG. 10.
Figure 12:
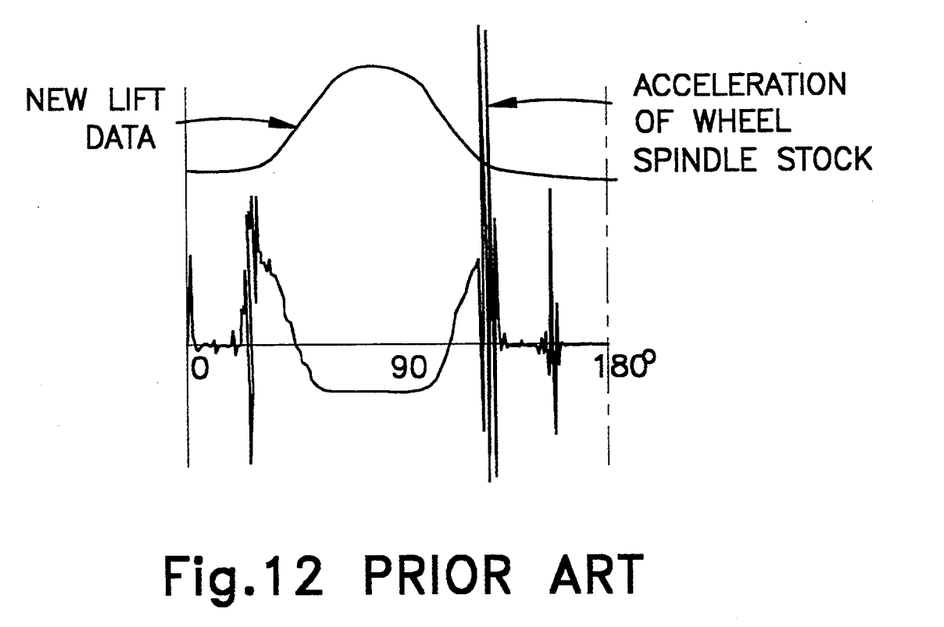
FIG. 12 is a graph showing a variation of acceleration of the wheel spindle stock during the fabrication according to new lift data in the numerical control of FIG. 10.

The foregoing smoothing and interpolation are usually carried out only at each predetermined interval as shown in FIG. 11. In other words, the smoothing and interpolation at the constant and predetermined interval cannot eliminate the errors sufficiently, and cannot assure a smooth smoothing/interpolating curve. Therefore, if the workpiece is fabricated based on the X/C-axis data which are prepared according to the foregoing new lift data, the wheel spindle stock tends to irregularly accelerate in the moving direction thereof as shown in FIG. 12. Such irregular acceleration leads to vibrations of the wheel spindle stock and the grinding wheel, which would lower the quality of the fabricated workpiece and shorten the effective life of the grinding machine.

SUMMARY OF THE INVENTION

The present invention is intended to provide a control unit for overcoming the foregoing problems of conventional NC grinding machines. The control unit automatically smoothes and interpolates lift data containing errors so as to obtain new substantially error-free lift data, thereby allowing a smooth rotation of a main spindle and reduced vibrations of a wheel spindle stock, and improving the quality of fabricated workpieces.

According to the invention, there is provided a numerical control unit comprising: a section for converting data whose pitch is unequal (called "unequal pitch data") into data whose pitch is equal (called "equal pitch data"); a section for extending errors in the converted equal pitch; a section for smoothing and interpolating the errors in the extended equal pitch data by varying an interval to be smoothed and interpolated; a section for varying the smoothing and interpolating portions until the smoothed and interpolated data meet a predetermined application criterion; and a section for inversely calculating the extended errors in the smoothed and interpolated data meeting the application criterion so as to obtain new shape data.

The numerical control unit of the invention functions to control the rotation of a non-circular workpiece and displacement of tools in a numerically controlled fabricating machine. The present invention is described with respect to its application to a numerically controlled (NC) grinding machine.

In the invention, lift data which contain errors and of which pitch is unequal are amended to data whose pitch is equal. Errors of the equal pitch data are extended by calculation. The extended lift data are smoothed based on a spline function by varying an interpolation interval until the data meet a predetermined criterion. The data which have been smoothed and interpolated and meet the criterion are subject to inverse calculation so as to obtain new lift data. The new lift data are used to derive X/C-axis data by considering the diameter of the grinding wheel and time interval per rotation of the workpiece. The NC grinding machine fabricates the workpiece based on the X/C-axis data.

DESCRIPTION OF THE PREFERRED EMBODIMENT

The invention will be described with reference to an embodiment shown in the drawing figures.

Figure 1:
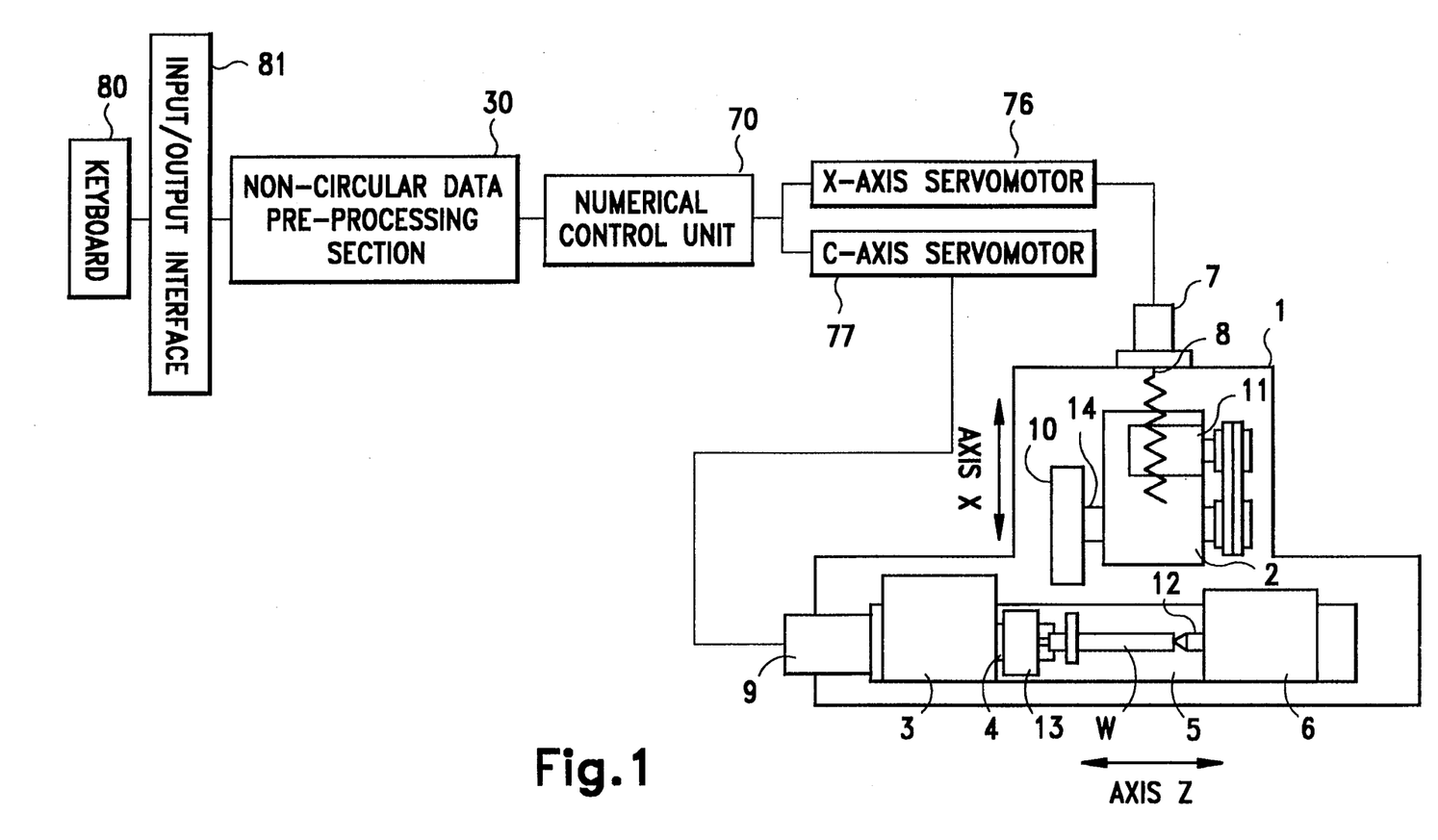
FIG. 1 is a block diagram of a numerical control unit according to an embodiment of the invention, showing the numerical control unit applied to an NC grinding machine.

In an NC grinding machine shown in FIG. 1, a wheel spindle stock 2 is supported on the rear of a bed 1, and 1s movable along an axis X. The wheel spindle stock 2 is coupled to an X-axis servomotor 7 fixedly mounted on the bed 1. The X-axis servomotor 7 reciprocates and positions the wheel spindle stock 2. A grinding wheel spindle 14 is rotatably supported on the wheel spindle stock 2, and includes a grinding wheel 10 which is detachably fitted thereon.

The bed 1 has a sliding member on the front side thereof, which is slidable along an axis Z. A table 5 is movably positioned on the sliding member. The table 5 includes a head stock 3 and a core clamp 6, both of which are movable. The head stock 3 receives the main spindle 4 to be rotatable thereon. The main spindle 4 is rotated by a C-axis servomotor 9 fixedly mounted to the head stock 3. A chuck 13 is concentrically fitted around one end of the main spindle 4. A non-circular workpiece W is placed between the chuck 13 and a center 12 attached to the core clamp 6. Thus, the workpiece W is smoothly rotated by the main spindle 4.

Figure 2:
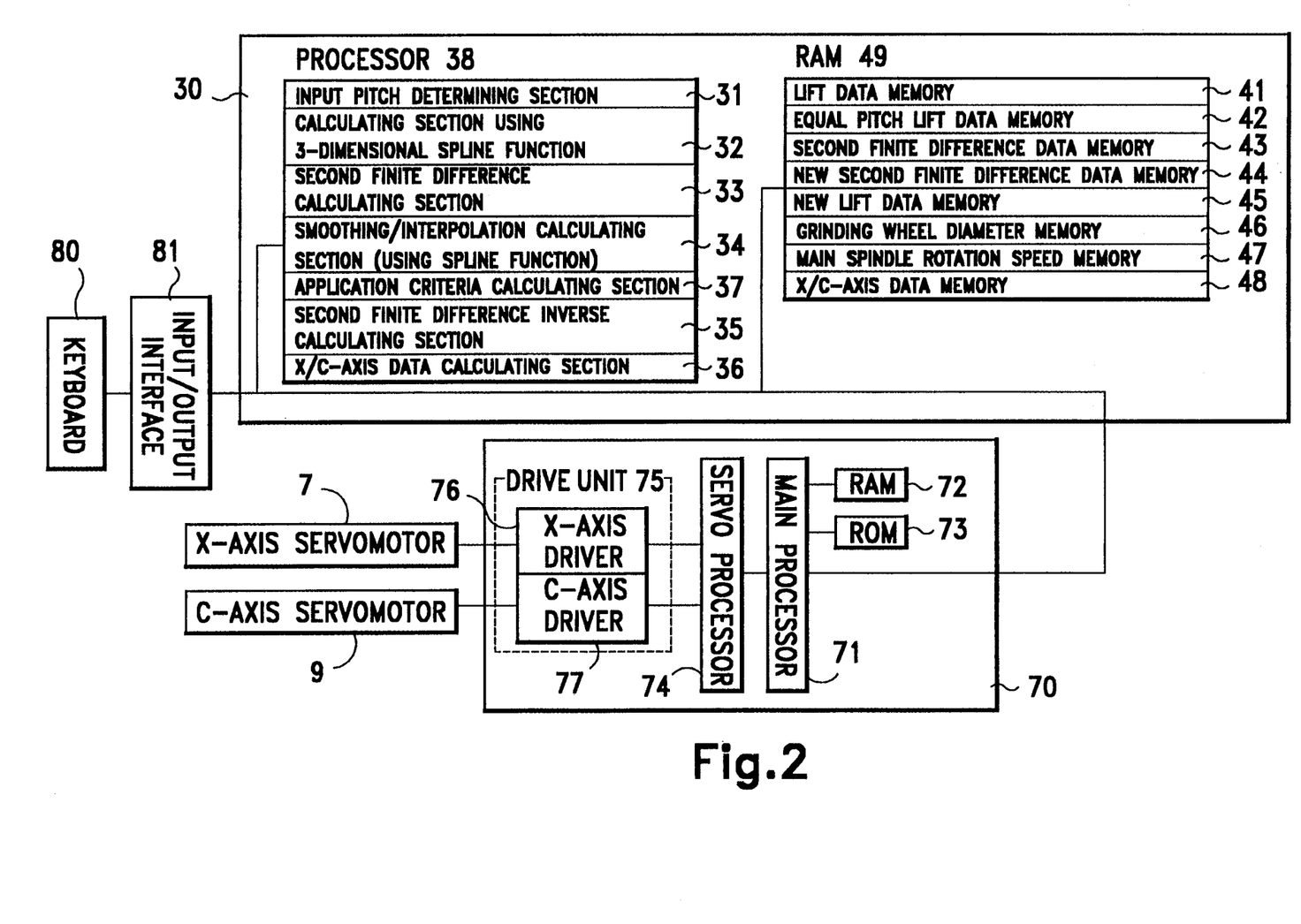
FIG. 2 is a block diagram of a non-circular data pre-processing unit and peripheral sections of the numerical control unit shown in FIG. 1.

Referring to FIGS. 1 and 2, a numerical control unit 70 is a servo system which performs various control operations. The numerical control unit 70 comprises a RAM 72 and a ROM 73, a main processor 71, a servo processor 74, and a drive unit 75. The RAM 72 stores parameter data concerning fabrication programs and spindle control. The ROM 73 stores software programs on the spindle control which are read when the grinding machine is actuated. The main processor 71 processes the foregoing data. The servo processor 74 performs processes to accelerate or decelerate the main spindle 4 in response To a spindle reciprocation request received from the main processor section 71, and issues a spindle reciprocation command to the drive unit 75. The drive unit 75 includes an X-axis drive section 76 and a C-axis drive section 77. The X-axis drive section 76 actuates an X-axis servomotor 7 while the C-axis drive section 77 actuates a C-axis servomotor 9.

A non-circular data pre-processing section 30 prepares new lift data, based on received lift data concerning a non-circular workpiece, by carrying out the smoothing/interpolating process using a second finite difference calculating process and the spline function. The new lift data are used to obtain X/C axis data by considering the diameter of the grinding wheel, and time interval per rotation of the workpiece.

As shown in FIG. 2, the non-circular data pre-processing section 30 comprises a main processor 38 and a RAM 49. The main processor 38 includes an input pitch determining section 31, a calculating section 32 performing calculation by using a 3-dimensional spline function (called "3-dimensional spline function calculating section 32"), a second finite difference calculating section 33, a smoothing/interpolation calculating section 34, and an X/C-axis data calculating section 36. The input pitch determining section 31 determines whether an input pitch of the lift data representing the shape of the non-circular workpiece is equal or not. The 3-dimensional spline function calculating section 32 calculates and prepares equal pitch lift data by 3-dimensional interpolation when the Input pitch is not equal. The second finite difference calculating section 33 calculates finite differences of the equal pitch lift data, i.e., calculates a difference between adjacent values in the equal pitch lift data (a first finite difference), and further calculates a difference between values adjacent to the first finite difference (a second finite difference). The smoothing/interpolation calculating section 34 smoothes and interpolates, by using The spline function, the data prepared by the second finite difference calculating section 33. The application criterion calculating section 37 determines whether or not the smoothed data meet the application criterion (as will be described later). The inverse-calculating section 35 inversely calculates the second finite difference data meeting the application criterion to obtain new lift data as will be described later. The X/C-axis data calculating section 36 calculates X/C-data based on the new lift data taking the grinding wheel diameter and the time interval per rotation of the workpiece into consideration.

The RAM 49 comprises a lift data memory 41, an equal pitch lift data memory 42, a second finite difference data memory 43, a new second finite difference data memory 44, a new lift data memory 45, a grinding wheel diameter memory 46, a main spindle rotation speed memory 47, and an X/C-shaft data memory 48. The lift data memory 41 stores input lift data. The equal pitch lift data memory 42 stores the input lift data representing the equal pitch, but converts the input lift data representing the unequal pitch into the lift data indicating the equal pitch and stores the converted lift data. The second finite data memory 43 stores the lift data after the second finite difference calculation. The new second finite difference data memory 44 stores data which have been smoothed by the spline function and meet the application criterion. The new lift data memory 45 stores new lift data which are obtained by the inverse calculation of the new second finite difference data. The grinding wheel diameter memory 46 stores the diameter of the grinding wheel 10. The main spindle rotation speed memory 47 stores data concerning the time interval per rotation of the workpiece W. The X/C-axis data memory 48 stores X/C-axis data representing displacement of the wheel spindle stock 2 along the x-axis when it is in contact with the workpiece, and the rotation angle of the main spindle 4.

Data input by the keyboard 80 are transmitted to the non-circular data pre-processing section 30 and the numerical control unit 70.

Figure 3:
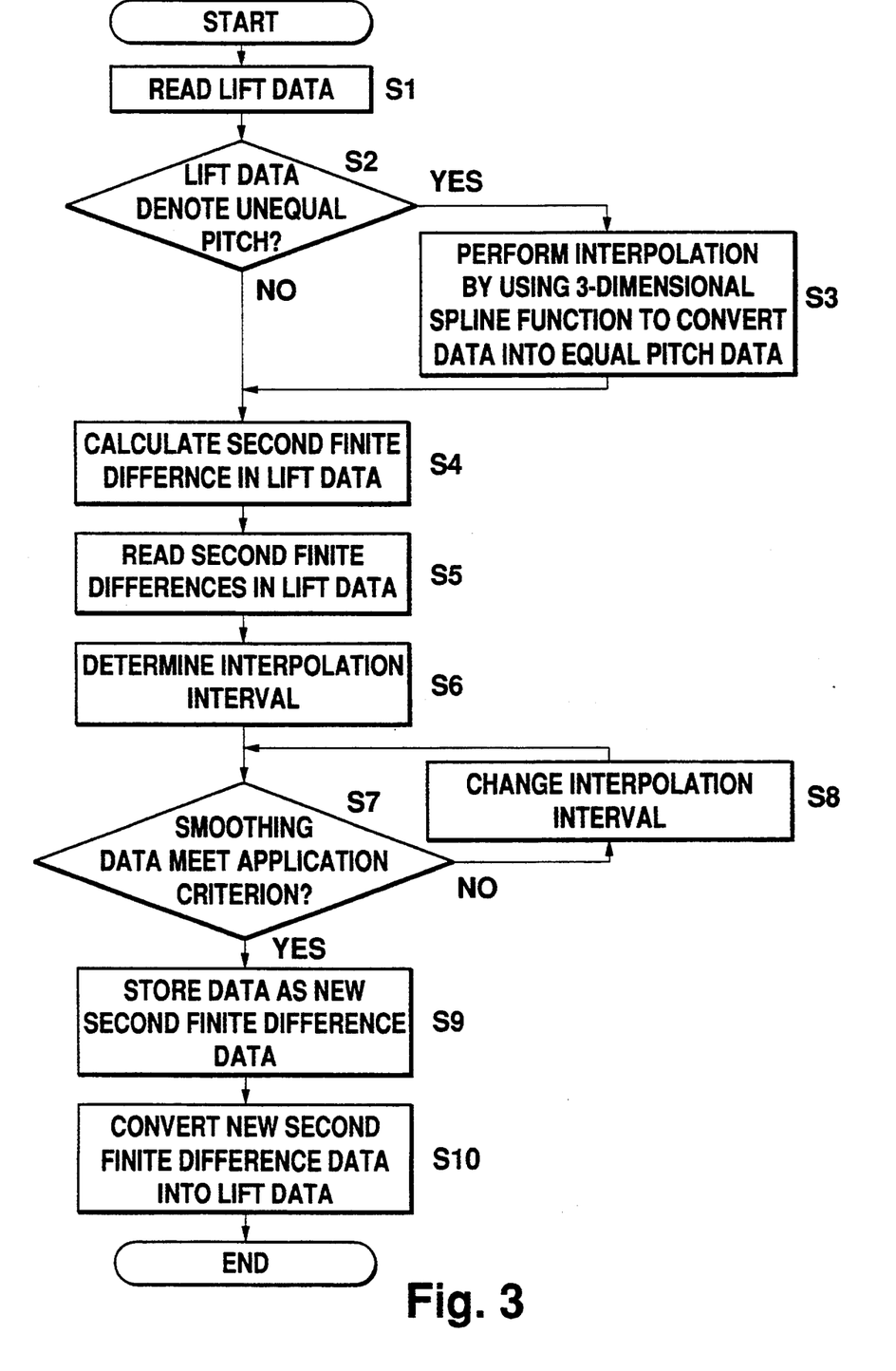
FIG. 3 is a flow chart for the numerical control unit.

The operation of the numerical control unit 70 of the invention will be described with reference to the flow chart shown in FIG. 3. Lift data stored in the lift data memory 41 are read into the input pitch determining section 31 (step S1). It is checked whether the lift data denote an unequal pitch (step S2). When the lift data denote the unequal pitch, the lift data are converted to equal pitch data by the 3-dimensional spline function calculating section 32, and are stored in the equal pitch data memory 42 (step S3). Conversely, when the lift data denote the equal pitch, the lift data are subject to the second finite difference calculation by the second finite difference calculating section 33. The resultant second finite difference data (described in detail below) are stored in the second finite difference data memory 43 (step S4).

The second finite difference data are completely read from the second finite difference data memory 43 into the smoothing/interpolating section 34 (step S5). Then, a first interpolating interval is determined (step S6), and will be smoothed and interpolated by the spline function (step S7). The smoothed data are checked as to whether or not they meet the application criterion. When the smoothed date do not meet the application criterion, the interpolation interval is lengthened or shortened (step S8), and is again smoothed and interpolated (step S7). Conversely, when the smoothed data meet the application criterion, they are stored in the new second infinite finite difference data memory 44 (step S9).

The data (new second finite difference data) are converted into new lift data by the second finite difference data inverse calculating section 35 (step S10), and are stored in the new lift data memory 45.

The second finite difference calculation, second finite difference inverse calculation, and application criterion will be described by exemplifying values.

Figure 4:
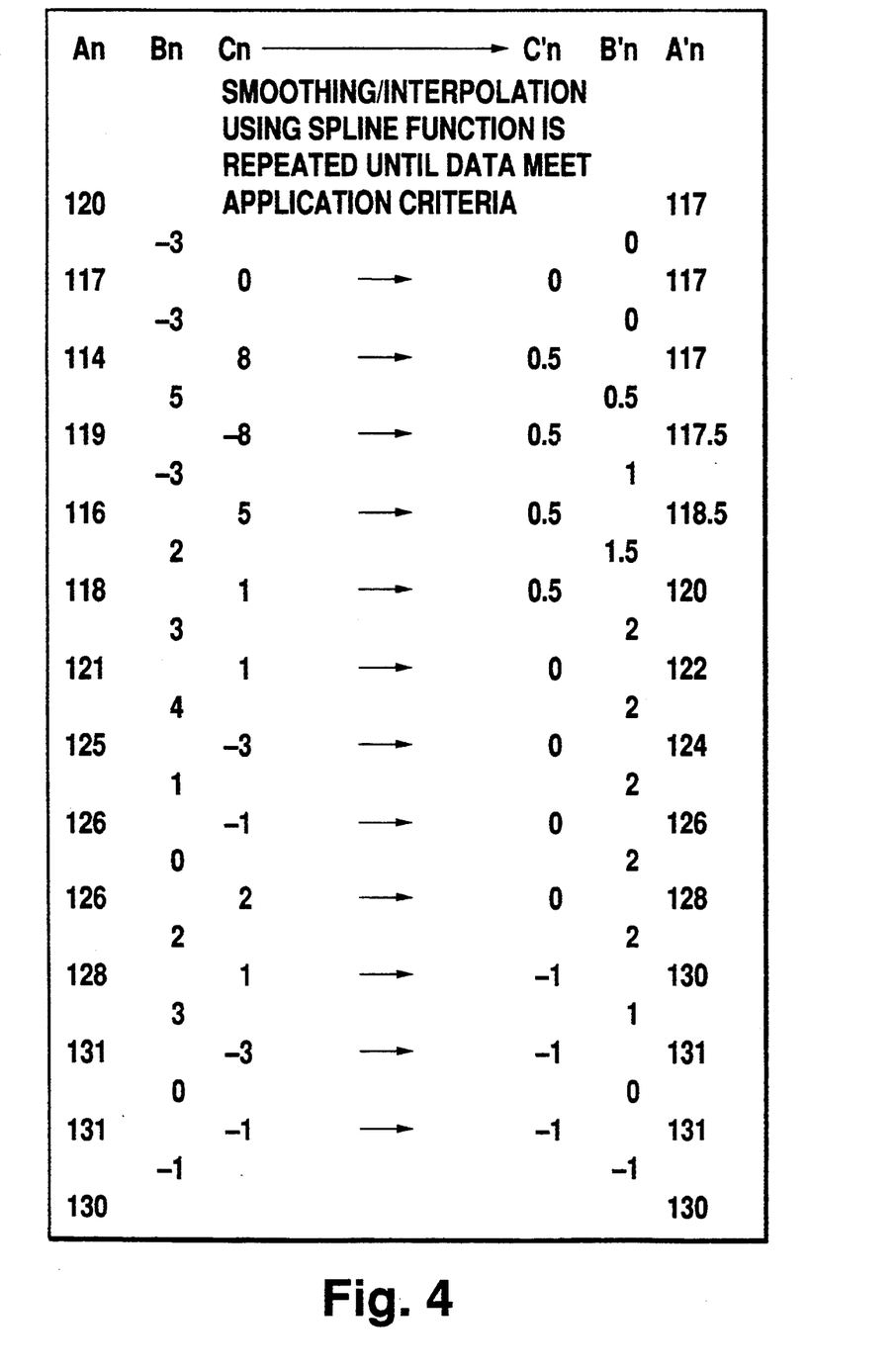
FIG. 4 is a difference table showing examples of backward differences calculated by a second finite difference calculating section.

Referring to the difference table of FIG. 4, "An" denotes values in the lift data (containing errors) for every pitch of the shape of the non-circular workpiece W, in other words, distances between the rotation center and the periphery of the workpiece W at each angle of rotation. In summary, "An" represents displacement of the wheel spindle stock 2 along the axis X. "Bn" represents first finite differences between adjacent numerical values listed in column "An". The first-step finite difference divided by time represents a speed of the wheel spindle stock 2. Further, "Cn" denotes a second finite difference between adjacent numerical values in column "Bn". In other words, two finite differences are calculated. The numerical values in column "Cn" divided by the square of time represents an acceleration of the wheel spindle stock 2 in its reciprocating direction. The second finite difference calculation is performed to extend errors in the lift data. "C'n" represent numerical values which are obtained by repeating the smoothing/interpolation until the lift data meet the application criterion. "B'n" denotes numerical values obtained by inversely calculating the first finite difference. "A'n" denotes numerical values obtained by inversely calculating the second finite difference. This inverse calculation is performed to return the extended errors to their original values, thereby obtaining new lift data.

Figure 5:
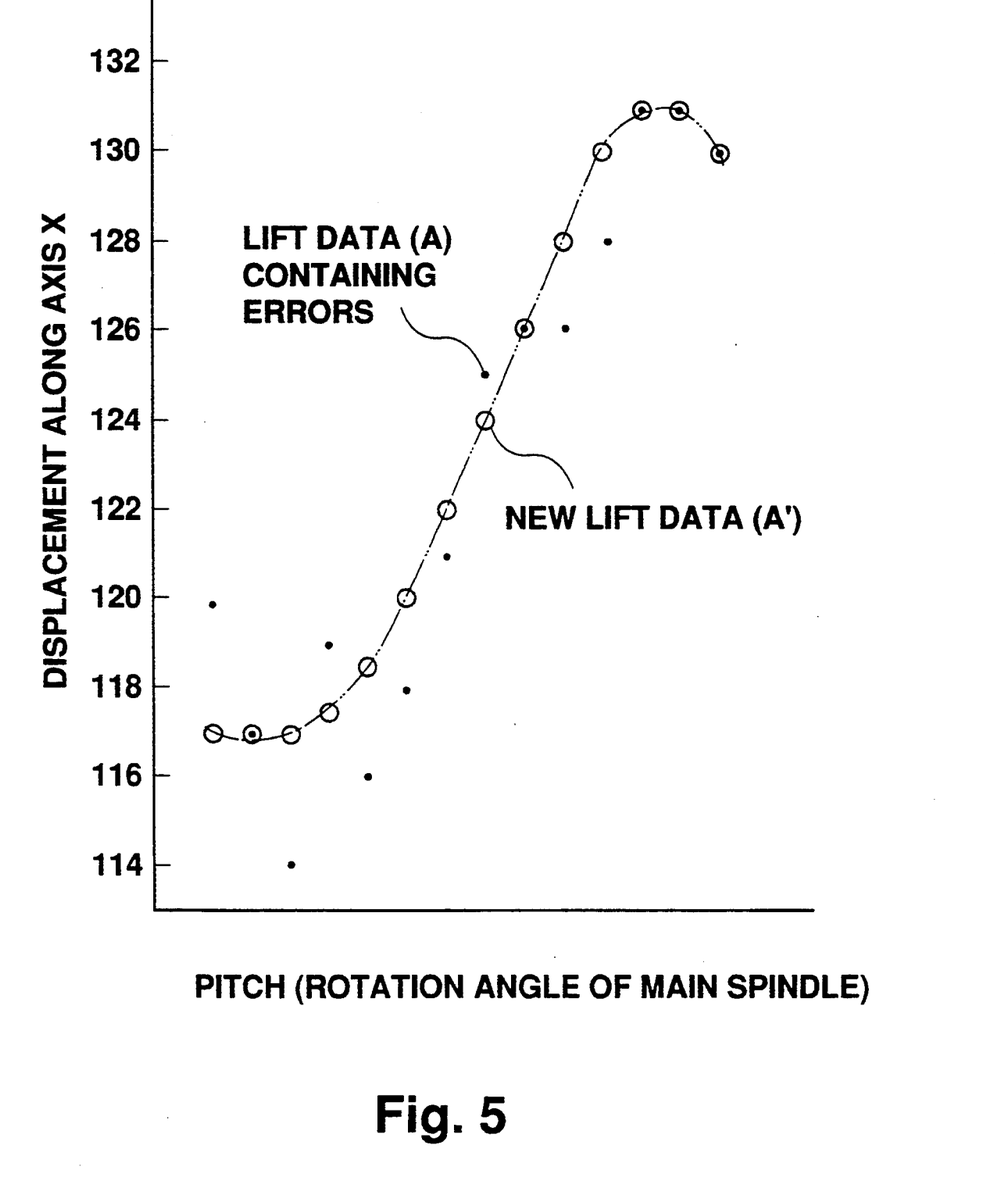
FIG. 5 is a graph plotted according to the values listed in the difference table in FIG. 4.

In FIG. 5, the lift data (A) containing errors are shown by dots, and the curve is plotted based on the new lift data (A'). It can be seen that the curve (i.e. new lift data (A')) is smooth.

Figure 6:
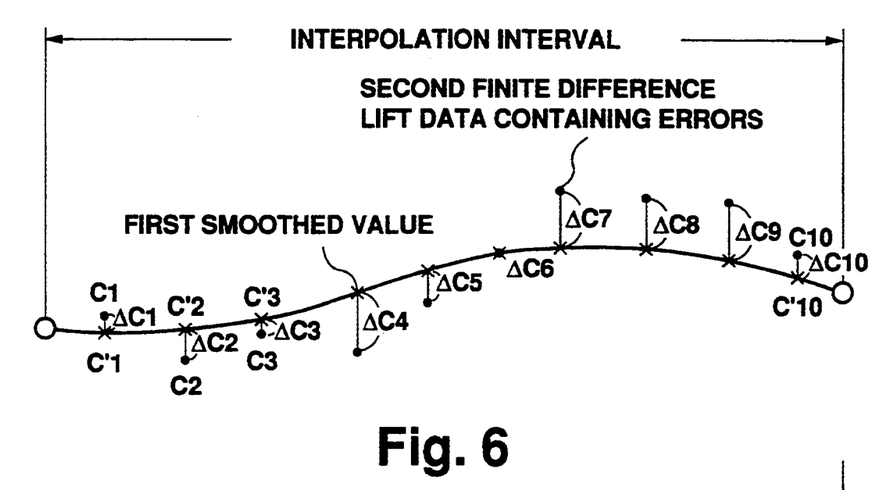
FIG. 6 is a graph showing an example of determination in application criterion processing.
Figure 7:
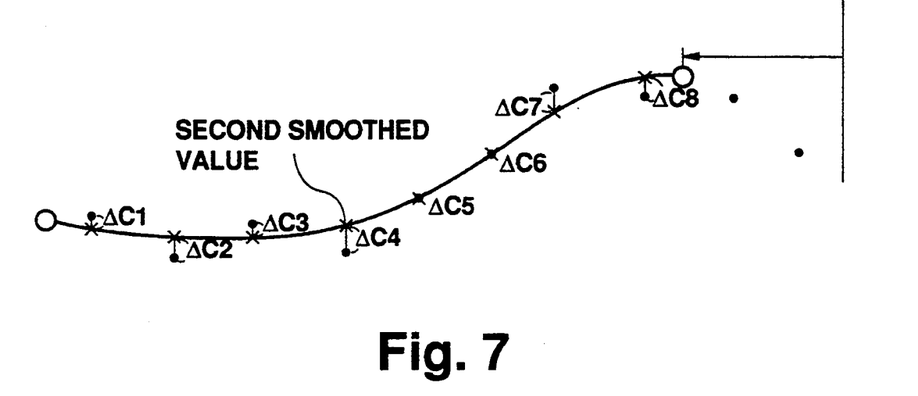
FIG. 7 is a graph similar to FIG. 6, but showing a second smoothed value.
Figure 8:
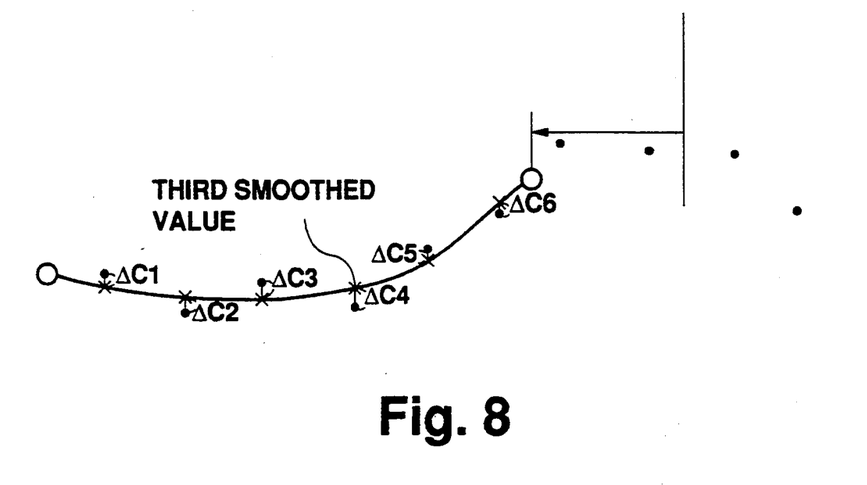
FIG. 8 is a graph similar to FIG. 6, but showing a third smoothed value.

Referring to FIG. 6, an interpolation interval contains values $C_1$ to $C_{10}$ of the second finite difference data. FIG. 6 also shows differences $\Delta C_1$ to $\Delta C_{10}$ between the values $C_1$ to $C_{10}$ and $C'_1$ to $C'_{10}$ which are smoothed by the spline function. The differences $\Delta C_1$ to $C_{10}$ are squared, added and converted into a value $(\Delta C_1^2 + \Delta C_2^2, \ldots \Delta C_{10}^2)$. The converted value is compared with a reference value which has been stored beforehand. When the converted values $\Delta C_1$ to $\Delta C_{10}$ deviate from the reference value, the smoothing/interpolating process is repeated by using a different interpolation interval as shown in FIG. 7. If the converted value is still larger than the reference value, the interpolation interval is lengthened or shortened as shown in FIG. 8, so that a third smoothing/interpolating process is carried out. Then, newly converted values $\Delta C_1$ to $\Delta C_6$ are compared with the reference value. When these values are smaller than the reference value, they are determined to meet the application criterion.

Figure 9:
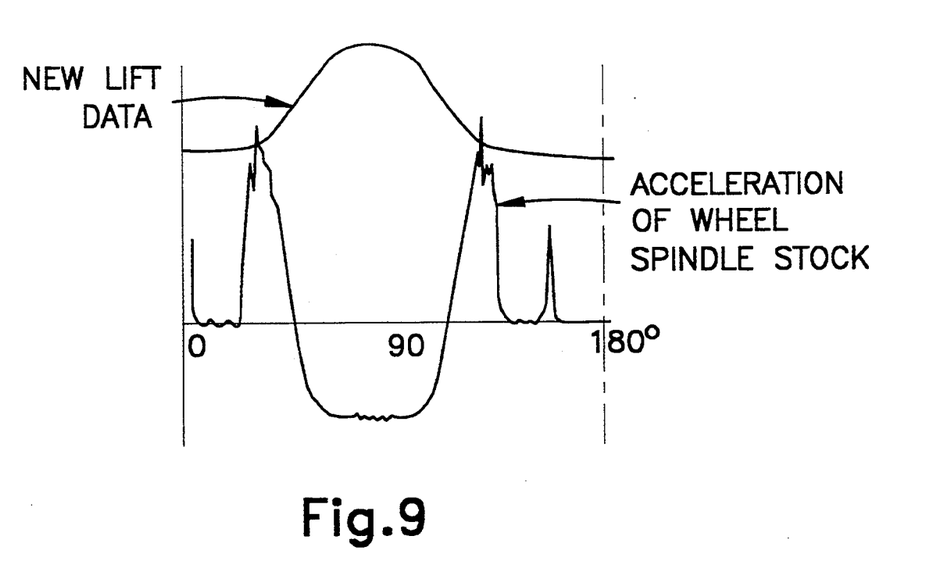
FIG. 9 is a graph showing a variation of acceleration of a wheel spindle stock during the fabrication according based on new lift data.

Referring to FIG. 9, the wheel spindle stock 2 accelerates when it operates according to the X/C-axis data obtained based on the new lift data. When compared with the acceleration of the wheel spindle stock shown in FIG. 12, the acceleration of the wheel spindle stock 2 varies very moderately, so that the wheel spindle stock 2 reciprocates and the main spindle 4 rotates substantially without vibrations.

In the numerical control unit according to the present invention, errors in the lift data are enlarged, and are smoothed and interpolated by varying the smoothing-/interpolating interval in succession until smoothed and interpolated data meet the application criterion. Thus new lift data assure substantially vibration free operation of the wheel spindle stock and the main spindle, which will lead to fabrication of the workpiece having a smooth surface. Further, the moving parts of the grinding machine are substantially free from grinding stress, which lengthens the life of the grinding machine.

Although an exemplary embodiment of the numerical control unit of the present invention has been shown and described, many changes, modification and substitutions or equivalent structure may be made by one of ordinary skill in the art without necessarily departing from the spirit and scope of this invention as defined by the appended claims.

For instance, the numerical control unit of the present invention may be applied to an NC fabricating machine so as to control the rotation of a non-circular workpiece and that of a machine tool for fabricating the workpiece. Specifically, the numerical control unit is applicable to a fabricating machine such as an NC lathe, NC milling cutter, or NC machining center. The workpiece is fabricated by a cutting tool when the numerical control unit is applied to the NC lathe. A milling cutter is used in the NC milling cutter. In the NC machining center, various cutting or grinding tools are used.

What is claimed is:

1. A numerical control unit for controlling a non-circular workpiece fabricating machine that fabricates a non-circular workpiece based on new shape data, rotation data and displacement data, said new shape data concerning a desired shape of said workpiece and being prepared by eliminating errors from existing data on said desired shape of said workpiece, said rotation data concerning a rotation angle of a main spindle for rotating the workpiece and said displacement data concerning displacement of fabricating tools, said rotation data and displacement data being prepared based on said new shape data so as to control the rotation of the main spindle and displacement of the fabricating tools, the numerical control unit comprising:

a) means for converting unequal pitch data representing said existing data on said desired shape into equal pitch data;
b) means for extending errors in said equal pitch data;
c) means for smoothing and interpolating said errors in the extended equal pitch data by varying an interval of said extended equal pitch data to be smoothed and interpolated;
d) means for varying the smoothing and interpolating of said intervals until said smoothed and interpolated extended equal pitch data meet a predetermined application criterion; and
e) means for inversely calculating the extended errors in the smoothed and interpolated data meeting the application criterion so as to obtain said new shape data to control said fabricating machine.

2. A numerical control unit as in claim 1, wherein the numerical control unit further comprises means for controlling the rotation of the non-circular workpiece and displacement of the fabricating tools.

3. A numerical control unit as in claim 2, wherein the non-circular workpiece fabricating machine is any of a numerically controlled grinding machine, a numerically controlled lathe, a numerically controlled milling machine, and a numerically controlled machining center.

4. A numerical control unit as in claim 3, wherein the numerical control unit further comprises means for controlling the rotation of a main spindle and displacement of a wheel spindle stock of the numerically controlled grinding machine based on new shape data which are prepared according to a diameter of a grinding wheel and time interval per rotation of the workpiece, and X/C-axis data representing a rotation angle of the main spindle and displacement of the wheel spindle stock.

* * * * *